United States Patent
Kuo et al.

(10) Patent No.: US 8,677,100 B2
(45) Date of Patent: Mar. 18, 2014

(54) SERIAL MEMORY INTERFACE FOR EXTENDED ADDRESS SPACE

(75) Inventors: Yulan Kuo, Hsinchu (TW); Kuen-Long Chang, Taipei (TW); Chun-Hsiung Hung, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 781 days.

(21) Appl. No.: 12/813,395

(22) Filed: Jun. 10, 2010

(65) Prior Publication Data

US 2011/0016291 A1    Jan. 20, 2011

Related U.S. Application Data

(60) Provisional application No. 61/226,569, filed on Jul. 17, 2009.

(51) Int. Cl.
*G06F 9/34*    (2006.01)

(52) U.S. Cl.
USPC ............ 712/210; 712/43; 712/229; 711/212; 365/189.17

(58) Field of Classification Search
USPC ........... 712/43, 210, 229; 711/212, 214, 102, 711/103, 104, 105; 365/189.15, 189.16, 365/189.17
See application file for complete search history.

(56) References Cited

U.S. PATENT DOCUMENTS

| | | | | |
|---|---|---|---|---|
| 4,400,768 A * | 8/1983 | Tomlinson | ........................ | 712/2 |
| 4,467,443 A * | 8/1984 | Shima | ........................... | 711/206 |
| 4,754,435 A * | 6/1988 | Takamatsu | ................ | 365/230.03 |
| 4,790,025 A * | 12/1988 | Inoue et al. | ................... | 382/293 |
| 4,855,957 A * | 8/1989 | Nogami | ..................... | 365/230.03 |
| 4,985,867 A * | 1/1991 | Ishii et al. | ...................... | 365/221 |
| 5,088,063 A * | 2/1992 | Matsuda et al. | .............. | 365/201 |
| 5,850,368 A * | 12/1998 | Ong et al. | ................... | 365/238.5 |
| 6,337,826 B1 * | 1/2002 | Imai et al. | ...................... | 365/221 |
| 6,385,125 B1 * | 5/2002 | Ooishi et al. | ................ | 365/233.1 |
| 6,766,433 B2 * | 7/2004 | Circello et al. | ............... | 711/202 |
| 7,042,800 B2 * | 5/2006 | Kang et al. | ............... | 365/189.14 |
| 7,146,546 B2 * | 12/2006 | Fukuda | ......................... | 714/718 |
| 7,330,381 B2 * | 2/2008 | Zink et al. | ................ | 365/189.07 |
| 7,382,637 B1 * | 6/2008 | Rathnavelu et al. | ........ | 365/49.17 |
| 7,877,566 B2 * | 1/2011 | Adusumilli | ................... | 711/169 |
| 7,895,402 B2 * | 2/2011 | Lee et al. | ...................... | 711/154 |
| 2009/0248955 A1 * | 10/2009 | Tamada | ........................ | 711/102 |

FOREIGN PATENT DOCUMENTS

EP    1071095 A2 *    1/2001    .............. G11C 7/22

OTHER PUBLICATIONS

Macronix International Co., Ltd., Data Sheet for MX25L12805D 128M-BIT [x 1] CMOS Serial Flash, Rev. 1.0, Feb. 26, 2008, pp. 1-42.

* cited by examiner

*Primary Examiner* — Aimee Li
(74) *Attorney, Agent, or Firm* — Kenta Suzue; Haynes Beffel & Wolfeld LLP (57) ABSTRACT

An integrated circuit memory device has a memory array and control logic with at least a first addressing mode in which the instruction includes a first instruction code and an address of a first length; and a second addressing mode in which the instruction includes the first instruction code and an address of a second length. The first length of the address is different from the second length of the address.

16 Claims, 8 Drawing Sheets

| Block(64K-byte) | Block(32K-byte) | Sector | Address Range | |
|---|---|---|---|---|
| 511 | 1023 | 8191 | 1FFF000h | 1FFFFFFh |
| | | ⋮ | ⋮ | ⋮ |
| | | 8184 | 1FF8000h | 1FF8FFFh |
| | 1022 | 8183 | 1FF7000h | 1FF7FFFh |
| | | ⋮ | ⋮ | ⋮ |
| | | 8176 | 1FF0000h | 1FF0FFFh |
| 510 | 1021 | 8175 | 1FEF000h | 1FEFFFFh |
| | | ⋮ | ⋮ | ⋮ |
| | | 8168 | 1FE8000h | 1FE8FFFh |
| | 1020 | 8167 | 1FE7000h | 1FE7FFFh |
| | | ⋮ | ⋮ | ⋮ |
| | | 8160 | 1FE0000h | 1FE0FFFh |

| | | | | |
|---|---|---|---|---|
| 1 | 3 | 31 | 001F000h | 001FFFFh |
| | | ⋮ | ⋮ | ⋮ |
| | | 24 | 0018000h | 0018FFFh |
| | 2 | 23 | 0017000h | 0017FFFh |
| | | ⋮ | ⋮ | ⋮ |
| | | 16 | 0010000h | 0010FFFh |
| 0 | 1 | 15 | 000F000h | 000FFFFh |
| | | ⋮ | ⋮ | ⋮ |
| | | 8 | 0008000h | 0008FFFh |
| | 0 | 7 | 0007000h | 0007FFFh |
| | | ⋮ | ⋮ | ⋮ |
| | | 0 | 0000000h | 0000FFFh |

FIG. 9

SERIAL MEMORY INTERFACE FOR EXTENDED ADDRESS SPACE

REFERENCE TO RELATED APPLICATION

This application claims the benefit of U.S. Provisional Application 61/226,569 filed 17 Jul. 2009, which is incorporated herein by reference.

BACKGROUND

1. Field of the Invention

This technology relates to a serial memory interface, such as Serial Peripheral Interface.

2. Description of Related Art

Conventional serial flash use a 24-bit address steam through the input pin or pins for accessing to memory up to 128 Mb. Because the capacity of storage is limited to 128 Mb by the number of address bits, applications are limited by the memory size.

SUMMARY

Various embodiments of the serial memory interface described herein are suitable for enlarged memory sizes.

One aspect of the technology is an apparatus including a memory integrated circuit device with a memory array, an interface, and control logic.

The memory integrated circuit device has a first memory space, a second memory space, an interface, and control logic.

The interface comprises an input pin receiving an instruction.

The control logic has a selectable mode of multiple addressing modes processing the instruction. The multiple addressing modes include:

(i) a first addressing mode in which the instruction includes a first instruction code and an address of the first length; and (ii) a second addressing mode in which the instruction includes the first instruction code and an address of the second length.

In some embodiments, a first memory space of the memory array is addressable via the address of the first length. A second memory space of the memory array is addressable via of address of the second length. The first length of the address is different from the second length of the address. In some embodiments, the first memory space is a part of the second memory space.

Instruction codes can be shared between different addressing modes. In some embodiments, the first instruction code is one of multiple instruction codes compatible with the address of the first length and the address of the second length.

The control logic can have a default addressing mode. In some embodiments, the control logic, by default, is in the first addressing mode processing the instruction including the first instruction code and the address of the first length, rather than the second addressing mode processing the instruction including the second instruction code and the address of the second length. In some embodiments, after powering and powering back on, the control logic is in first mode processing the instruction including the first instruction code and the address of the first length.

An address mode instruction code can change the control logic between addressing modes. In some embodiments, responsive to processing by the control logic of the instruction including an address mode instruction code, the control logic is in the second addressing mode processing the instruction including the first instruction code and the address of the second length. In some embodiments, responsive to processing by the control logic of the instruction including an address mode instruction code, the control logic exits the first addressing mode processing the instruction including the first instruction code and the address of the first length.

Another address mode instruction code can return the control logic to a prior addressing mode. In some embodiments, at a time after the control logic processes the instruction including the first address mode instruction code, then responsive to processing by the control logic of the instruction including a second address mode instruction code different from the first address mode instruction code, the control logic is in the first addressing mode processing the instruction including the first instruction code and the address of the first length. In some embodiments, at a time after the control logic processes the instruction including the first address mode instruction code, then responsive to processing by the control logic of the instruction including a second address mode instruction code different from the first address mode instruction code, the control logic exits the second addressing mode processing the instruction including the first instruction code and the address of the second length.

This aspect of the technology is advantageous in maintaining compatibility with products that include a prior generation of the technology, such that the legacy code does not have to be rewritten.

A memory location distinct from the memory spaces can store an indication of the memory space to be accessed. Some embodiments further comprise a memory space register different from the first memory space and the second memory space. The memory space register indicates whether to access the first memory space or the second memory space.

In some embodiments, the memory integrated circuit device has multiple memory spaces and a memory space register.

The multiple memory spaces of the memory array include a default memory space. Each memory space of the multiple memory spaces is addressable via a predetermined length of address. In some embodiments the default memory space is a part of another memory space.

The memory space register is different from the multiple memory spaces. The memory space register indicates whether to access the default memory space or another memory space of the multiple memory spaces.

The control logic performs the instruction on the default memory space or another memory space of the multiple memory spaces according to the memory space register.

The multiple memory spaces can include a default memory space. In some embodiments, the multiple memory spaces include at least the default memory space and a non-default memory space, and the predetermined length of address of the default memory space and the predetermined length of address of the non-default memory space have different address lengths. In some embodiments, after powering and powering back on, the memory space register indicates access of said default memory space.

An address mode instruction code can change the control logic between address spaces. In some embodiments, responsive to processing by the control logic of the instruction including an address mode instruction code, the memory space register indicates access of another memory space rather than the default memory space. In some embodiments, responsive to processing by the control logic of the instruction including an address mode instruction code, the memory space register no longer indicates access of the default memory space.

Another address mode instruction code can return the control logic to a prior address space. In some embodiments, at a time after the control logic processes the instruction including the first address mode instruction code, then responsive to processing by the control logic of the instruction including a second address mode instruction code different from the first address mode instruction code, the memory space register indicates access of the default memory space.

This aspect of the technology is advantageous in maintaining compatibility with products that include a prior generation of the technology, such that the legacy code does not have to be rewritten. In some embodiments, responsive to the control logic receiving the instruction including a read instruction code, the control logic reads out (i) data from the default memory space and (ii) data from another memory space inaccessible via the predetermined length of address of the default memory space.

In yet other embodiment of the technology the memory array has a first size and is addressable via the address of the first length. The memory array comprises a sub-array. The sub-array has a second size addressable via the address of the second length. The second size is smaller than the first size, and the second length is shorter than the first length.

The control logic performs the instruction with the address of the first length responsive to the instruction code being one of a first set of instruction codes. The control logic performs the instruction with the address of the second length responsive to the instruction code being one of a second set of instruction codes.

Instruction codes can be distinct between the first set of instruction codes and the second set of instruction codes. In some embodiments, instruction codes in the first set of instruction codes are different from instruction codes in the second set of instruction codes.

This aspect of the technology is advantageous in maintaining compatibility with products that include a prior generation of the technology, such that the legacy code does not have to be rewritten. In some embodiments, responsive to the control logic receiving the instruction including a read instruction code, the control logic reads out (i) data from the sub-array and (ii) data from said memory array inaccessible via the address of the second length.

DETAILED DESCRIPTION

Therefore, various new interfaces for serial flash are provided that have the capability of access to a memory space greater than conventional serial flash, exceeding 128 Mb, while still compatible with an existing serial flash specification.

A conventional serial flash input for the READ operation is:

(8-bit command)+(24-bit address)

The new interface of a serial flash can be implemented through the following mechanisms. Each can be implemented on existing packages (such as 8-pin, 16-pin, 28-pin, 24-BGA, etc), so that no change to the package specification or pin assignment is needed.

The 1st Approach: Setting Long-Address Mode (LA Mode)

(a) using a command (such as "F2h") to switch the serial flash device into a Long-Address Mode, before or after an operation command (such as "03h" for READ) is entered to set an internal indicator (such as a flag), so that the device will recognize a predetermined number of bits which is greater than 24, for example, 32 bit (four bytes), 40 bits (five bytes), 48 bits (six bytes), etc.) as an address for the operation. For example, a read command sequence for a 32 bit address can include a serial bit stream that includes a Long-Address Mode command, a Read command and four bytes of address; a read command sequence for a 40 bit address includes a Long-Address Mode command, a Read command and five bytes of address; and so on.

Figure 1:
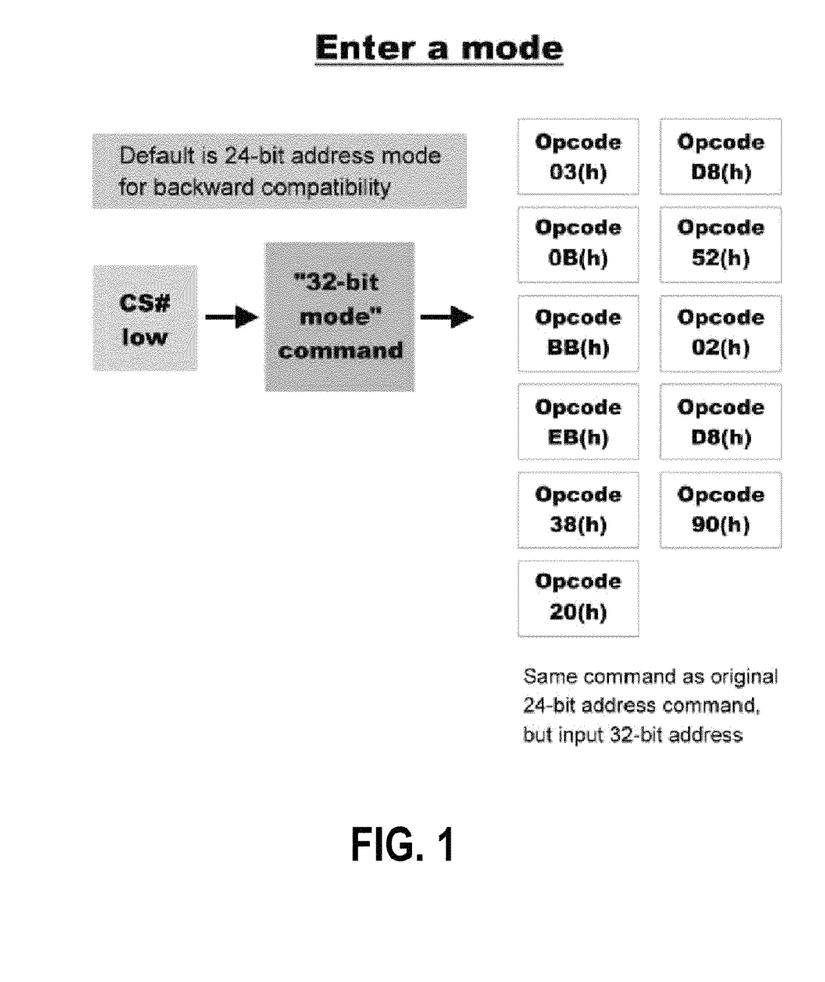
FIG. 1 is an example of the operation of a memory integrated circuit with a default 24-bit addressing mode that, upon receipt of a 32-bit address mode instruction code, enters a 32-bit address mode, such that memory instructions are processed with: (i) 32-bit memory addresses and (ii) shared instruction codes that are common to the 24-bit addressing mode and the 32-bit addressing mode.

FIG. 1 is an example of the operation of a memory integrated circuit with a default 24-bit addressing mode that, upon receipt of a 32-bit address mode instruction code, enters a 32-bit address mode, such that memory instructions are processed with: (i) 32-bit memory addresses and (ii) shared instruction codes that are common to the 24-bit addressing mode and the 32-bit addressing mode.

(b) After the operation is performed, it may be an option of design to either make the device automatically return to normal mode (24-bit address), or by another command (such as "F3h") to manually exit the Long-Address Mode, and then back to normal mode.

Figure 2:
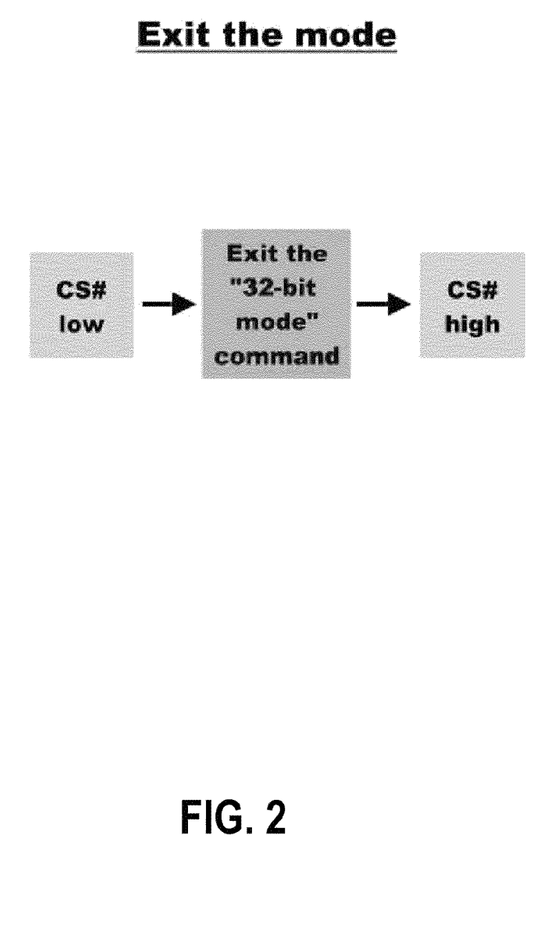
FIG. 2 is an example of the operation of a memory integrated circuit supplementing FIG. 1, in which the memory integrated circuit exits the 32-bit address mode and returns to the 24-bit addressing mode, upon receipt of a 24-bit address mode instruction code, such that memory instructions are processed with: (i) 24-bit memory addresses, and (ii) shared instruction codes that are common to the 24-bit addressing mode and the 32-bit addressing mode.

FIG. 2 is an example of the operation of a memory integrated circuit supplementing FIG. 1, in which the memory integrated circuit exits the 32-bit address mode and returns to the 24-bit addressing mode, upon receipt of a 24-bit address mode instruction code, such that memory instructions are processed with: (i) 24-bit memory addresses, and (ii) shared instruction codes that are common to the 24-bit addressing mode and the 32-bit addressing mode.

(c) The interface can be more flexible if different commands are used respectively for different length of addresses, for example, using "F2h" for entering into 32-bit LA Mode, and using "F4h" for entering into 40-bit LA Mode, etc. We can either use the same command (such as "F3h") for all LA Modes to exit to normal mode, or we can use different EXIT commands for each LA Mode. Of course, automatic exit to normal mode after one LA Mode operation is finished is also an option for design.

(d) The device will be reset to normal mode on power down (or, on power up).

Figure 3:
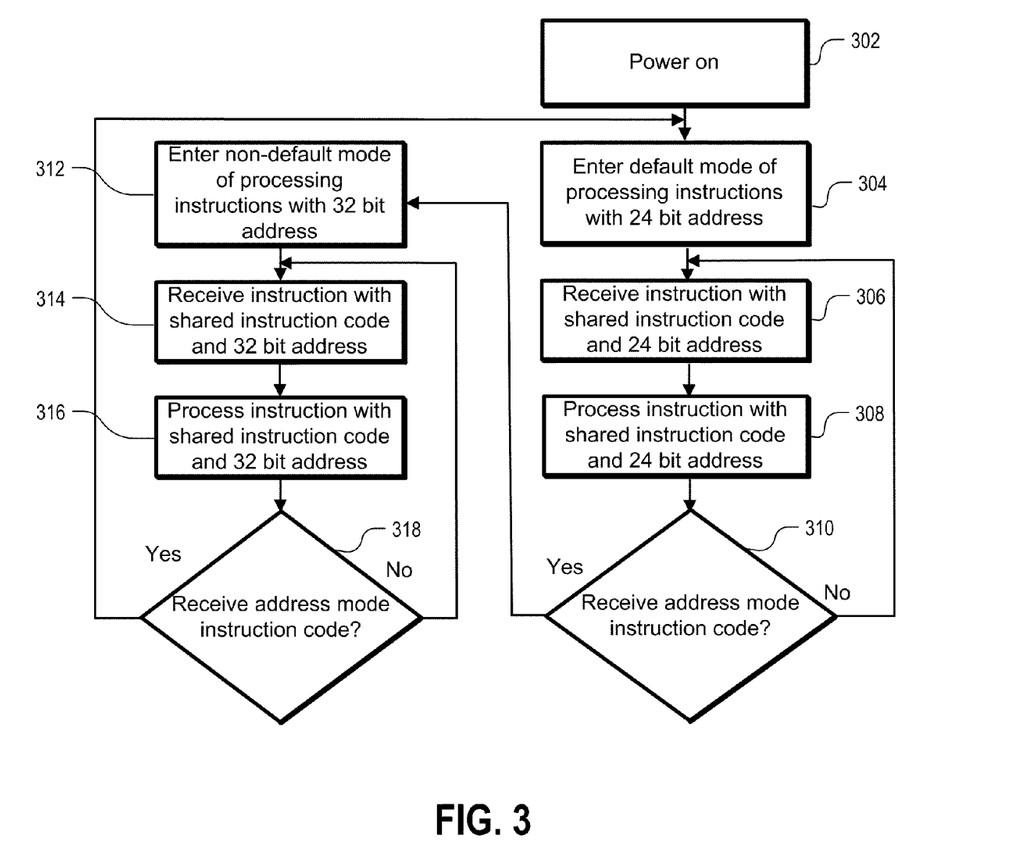
FIG. 3 is an example of a process flow of the memory integrated circuit of FIGS. 1 and 2 which processes memory instructions with (i) shared instruction codes that are common to the 24-bit addressing mode and the 32-bit addressing mode and (ii) 24-bit memory addresses or 32-bit memory addresses, depending on the present address mode of the memory integrated circuit.

FIG. 3 is an example of a process flow of the memory integrated circuit of FIGS. 1 and 2 which processes memory instructions with (i) shared instruction codes that are common to the 24-bit addressing mode and the 32-bit addressing mode and (ii) 24-bit memory addresses or 32-bit memory addresses, depending on the present address mode of the memory integrated circuit.

In 302, power on occurs. In 304, a default mode is entered, following power on, of processing instructions with 24 bit addresses. In 306, regular operation in 24 bit address mode begins. An instruction is received with a shared instruction code and a 24 bit address. The instruction code is shared in that the instruction code is used regardless of whether the integrated circuit is in 24 bit address mode or 32 bit address mode. Examples of such shared instruction codes are: READ (read data), FAST READ (fast read data), 2READ (2×I/O read command interleaving every two bits on 2 I/O pins), 4READ (4×I/O read command interleaving every four bits on 4 I/O pins), 4PP (quad page program taking 4 I/O pins), SE (sector erase), BE (block erase 64 KB), BE 32K (block erase 32 KB), PP (page program), CP (continuously program mode automatically increasing the address to the next higher address after each byte data has been programmed), REMS (read electronic manufacturer & device ID), REMS2 (read ID for 2×I/O mode), REMS4 (read ID for 4×I/O mode), SBLK (single block lock for write protection of a specified block or sector), SBULK (single block unlock canceling the block or sector write protection state), RDBLOCK (block protect read for reading the status of protection lock of a specified block or sector), and RDDMC (read Discoverable Memory Capabilities to retrieve operating characteristics, structure and vendor specified information such as identifying information, memory size, operating voltages timing information of the device).

In 308, the instruction, including the shared instruction code and the 24 bit address, is processed. In 310, if an address mode instruction code is not received, regular operation in 24 bit address mode continues, and the loop continues back with 306 again. In 310, if an address mode instruction code is received, then in 312 the integrated circuit enters 32 bit address mode. In 312, regular operation in 32 bit address mode begins. An instruction is received with a shared instruction code and a 32 bit address. The instruction code is shared in that the instruction code is used regardless of whether the integrated circuit is in 24 bit address mode or 32 bit address mode. In 316, the instruction, including the shared instruction code and the 32 bit address, is processed. In 318, if an address mode instruction code is not received, regular operation in 32 bit address mode continues, and the loop continues back with 314 again. In 318, if an address mode instruction code is received, then in 304 the integrated circuit returns to 24 bit address mode.

Figure 4:
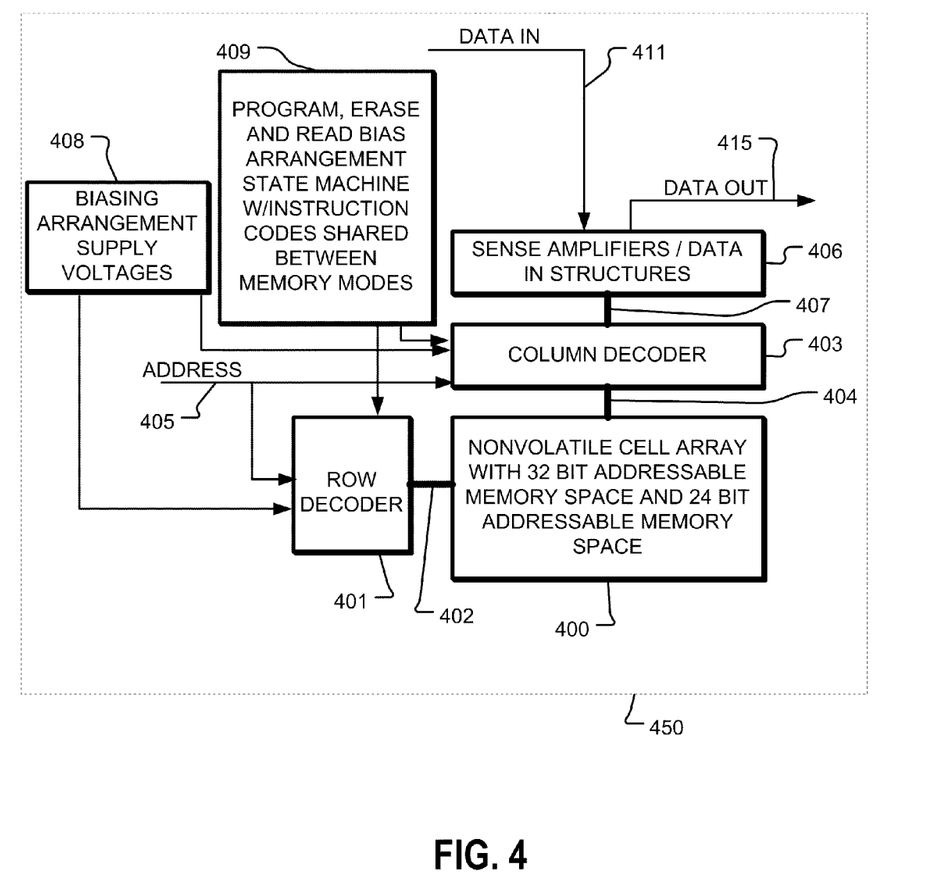
FIG. 4 is an example block diagram of the memory integrated circuit of FIGS. 1-3 which processes memory instructions with (i) shared instruction codes that are common to the 24-bit addressing mode and the 32-bit addressing mode and (ii) 24-bit memory addresses or 32-bit memory addresses, depending on the present address mode of the memory integrated circuit.

FIG. 4 is an example block diagram of the memory integrated circuit of FIGS. 1-3 which processes memory instructions with (i) shared instruction codes that are common to the 24-bit addressing mode and the 32-bit addressing mode and (ii) 24-bit memory addresses or 32-bit memory addresses, depending on the present address mode of the memory integrated circuit.

An integrated circuit 450 has a memory array 400 with a 32 bit addressable memory space and a 24 bit addressable memory space. A word line (or row) and block select decoder 401 is coupled to, and in electrical communication with, a plurality 402 of word lines, and arranged along rows in the memory array 400. A bit line (column) decoder and drivers 403 are coupled to and in electrical communication with a plurality of bit lines 404 arranged along columns in the memory array 400 for reading data from, and writing data to, the memory cells in the memory array 400. Addresses are supplied on bus 405 to the word line decoder and drivers 401 and to the bit line decoder 403. Sense amplifiers and data-in structures in block 406, including current sources for the read, program and erase modes, are coupled to the bit line decoder 403 via the bus 407. Biasing arrangement supply voltages 408 drive the row decoder 401 and word lines 402, and the column decoder 403 and the bit lines 404. A state machine 409 also drives the row decoder 401 and word lines 402, and the column decoder 403 and the bit lines 404. The state machine 409 is a program, erase and read bias arrangement state machine that processes instructions with instruction codes shared between memory modes. Data is supplied via the data-in line 411 from input/output ports on the integrated circuit 450, to the data-in structures in block 406. Data is supplied via the data-out line 415 from the sense amplifiers in block 406 to input/output ports on the integrated circuit 450, or to other data destinations internal or external to the integrated circuit 450.

The 2nd Approach: Using Multi-Page Setting (a) using at least a flag (or flags) or a register (for example, 4 bits for 16 pages) as a "page indicator", wherein each page contains 128 Mb and each can be accessed through a 24-bit address.

(b) Similar to the previous approach, a command (such as "F2h") can be used either before or after an operation command (such as "03h" for READ) to set the page of memory where the operation is to be performed.

(c) The flag or register can be reset to the default page through a command (such as "F3h"), or automatically reset to the default page after the operation is finished, or on power down (or, power up)

Figure 5:
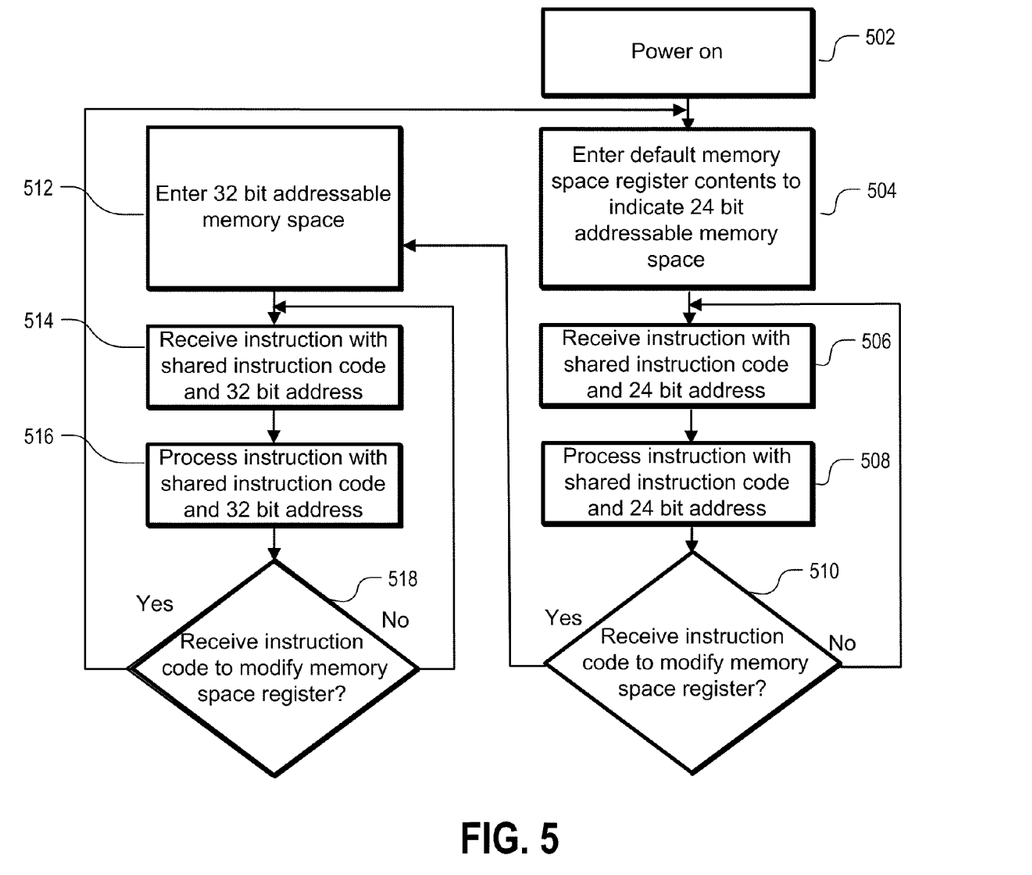
FIG. 5 is an example of a process flow of the memory integrated circuit which processes address mode instructions; stores the present addressing mode (e.g., 24-bit addressing mode or 32-bit addressing mode) of the memory integrated circuit and accordingly processes memory instructions with (i) shared instruction codes that are common to the 24-bit addressing mode and the 32-bit addressing mode and (ii) 24-bit memory addresses or 32-bit memory addresses.

FIG. 5 is an example of a process flow of the memory integrated circuit which processes address mode instructions; stores the present addressing mode (e.g., 24-bit addressing mode or 32-bit addressing mode) of the memory integrated circuit and accordingly processes memory instructions with (i) shared instruction codes that are common to the 24-bit addressing mode and the 32-bit addressing mode and (ii) 24-bit memory addresses or 32-bit memory addresses.

In 502, power on occurs. In 504, the default memory space register contents indicates a 24 bit addressable memory space, following power on, so as to process instructions with 24 bit addresses to access the 24 bit addressable memory space. In 506, regular operation in the 24 bit addressable memory space begins. An instruction is received with a shared instruction code and a 24 bit address. Examples of such shared instruction codes are: READ (read data), FAST READ (fast read data), 2READ (2×I/O read command interleaving every two bits on 2 I/O pins), 4READ (4×I/O read command interleaving every four bits on 4 I/O pins), 4PP (quad page program taking 4 I/O pins), SE (sector erase), BE (block erase 64 KB), BE 32K (block erase 32 KB), PP (page program), CP (continuously program mode automatically increasing the address to the next higher address after each byte data has been programmed), REMS (read electronic manufacturer & device ID), REMS2 (read ID for 2×I/O mode), REMS4 (read ID for 4×I/O mode), SBLK (single block lock for write protection of a specified block or sector), SBULK (single block unlock canceling the block or sector write protection state), RDBLOCK (block protect read for reading the status of protection lock of a specified block or sector), and RDDMC (read Discoverable Memory Capabilities to retrieve operating characteristics, structure and vendor specified information such as identifying information, memory size, operating voltages timing information of the device).

In 508, the instruction, including the shared instruction code and the 24 bit address, is processed. In 510, if an instruction code to modify the memory space register is not received, regular operation in the 24 bit addressable memory space continues, and the loop continues back with 506 again. In 510, if an instruction code to modify the memory space register is received, then in 512 the integrated circuit correspondingly enters the 32 bit addressable memory space. In 512, regular operation in the 32 bit addressable memory space. An instruction is received with a shared instruction code and a 32 bit address. The instruction code is shared in that the instruction code is used regardless of whether the integrated circuit is in the 24 bit addressable memory space or the 32 bit addressable memory space. In 516, the instruction, including the shared instruction code and the 32 bit address, is processed. In 518, if an instruction code to modify the memory space register is not received, regular operation in the 32 bit addressable memory space continues, and the loop continues back with 514 again. In 518, if an instruction code to modify the memory space register is received, then in 504 the integrated circuit returns to the 24 bit addressable memory space.

Figure 6:
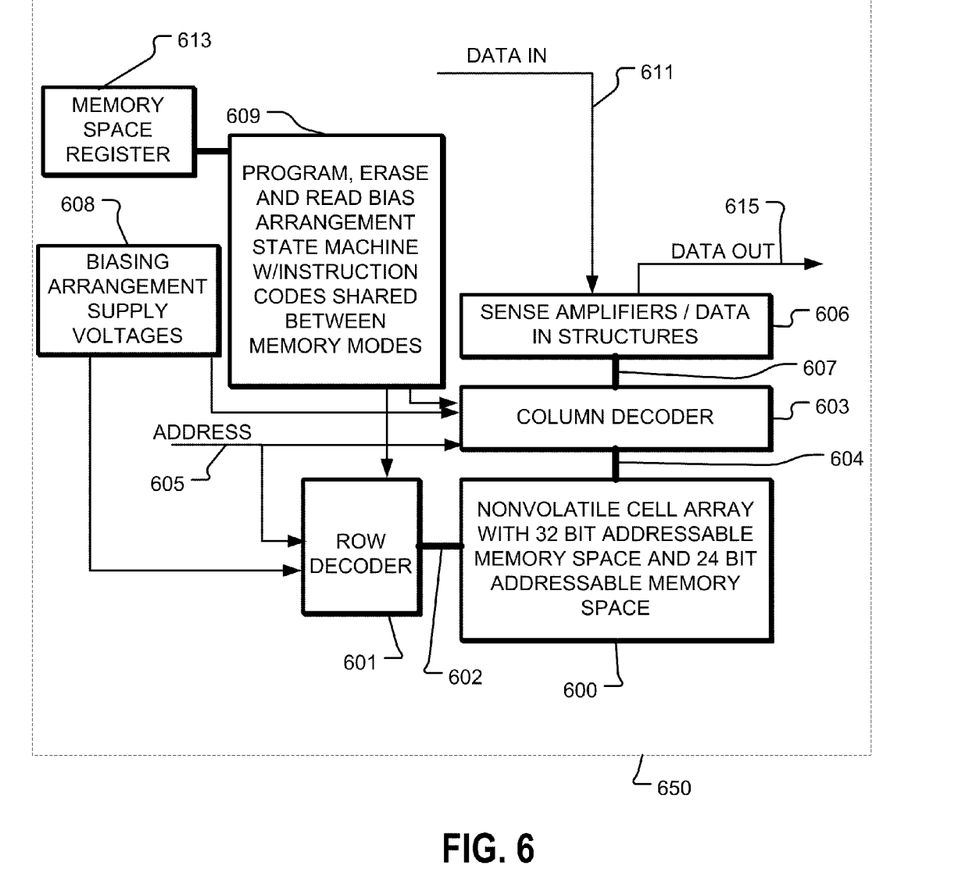
FIG. 6 is an example block diagram of the memory integrated circuit of FIG. 5 which processes address mode instructions; stores the present addressing mode (e.g., 24-bit addressing mode or 32-bit addressing mode) of the memory integrated circuit and accordingly processes memory instructions with (i) shared instruction codes that are common to the 24-bit addressing mode and the 32-bit addressing mode and (ii) 24-bit memory addresses or 32-bit memory addresses.

FIG. 6 is an example block diagram of the memory integrated circuit of FIG. 5 which processes address mode instructions; stores the present addressing mode (e.g., 24-bit addressing mode or 32-bit addressing mode) of the memory integrated circuit and accordingly processes memory instructions with (i) shared instruction codes that are common to the 24-bit addressing mode and the 32-bit addressing mode and (ii) 24-bit memory addresses or 32-bit memory addresses.

An integrated circuit 650 has a memory array 600 with a 32 bit addressable memory space and a 24 bit addressable memory space. A word line (or row) and block select decoder 601 is coupled to, and in electrical communication with, a plurality 602 of word lines, and arranged along rows in the memory array 600. A bit line (column) decoder and drivers 603 are coupled to and in electrical communication with a plurality of bit lines 604 arranged along columns in the memory array 600 for reading data from, and writing data to, the memory cells in the memory array 600. Addresses are supplied on bus 605 to the word line decoder and drivers 601 and to the bit line decoder 603. Sense amplifiers and data-in structures in block 606, including current sources for the read, program and erase modes, are coupled to the bit line decoder 603 via the bus 607. Biasing arrangement supply voltages 608 drive the row decoder 601 and word lines 602, and the column decoder 603 and the bit lines 604. A state machine 609 also drives the row decoder 601 and word lines 602, and the column decoder 603 and the bit lines 604. The state machine 609 is a program, erase and read bias arrangement state machine that processes instructions with instruction codes shared between memory modes. A memory space register 613 is controlled by the state machine 609, and stores data that indicates the presently addressable memory space. Data is supplied via the data-in line 611 from input/output ports on the integrated circuit 650, to the data-in structures in block 606. Data is supplied via the data-out line 615 from the sense amplifiers in block 606 to input/output ports on the integrated circuit 650, or to other data destinations internal or external to the integrated circuit 650.

The 3rd Approach: Using Long-address Commands (a) We can assign a whole set of new commands for performing Long-Address operations.

(b) For example, "03h" is an existing command for READ operation associated with a 24-bit address, we can then use "F3h" as READ operation but associated with a 32-bit address.

(c) The advantage is, the format of input is more compatible to the existing format, which is a command followed by an address. The disadvantage is, due to limited number of available command options in industry standard serial Flash Memory such as the MX25L12805D or the MX25L12845E, only a Dual Address Mode device might be available if we want the device with the standard commands and the extended commands, while being limited to only 8-bit commands.

Figure 7:
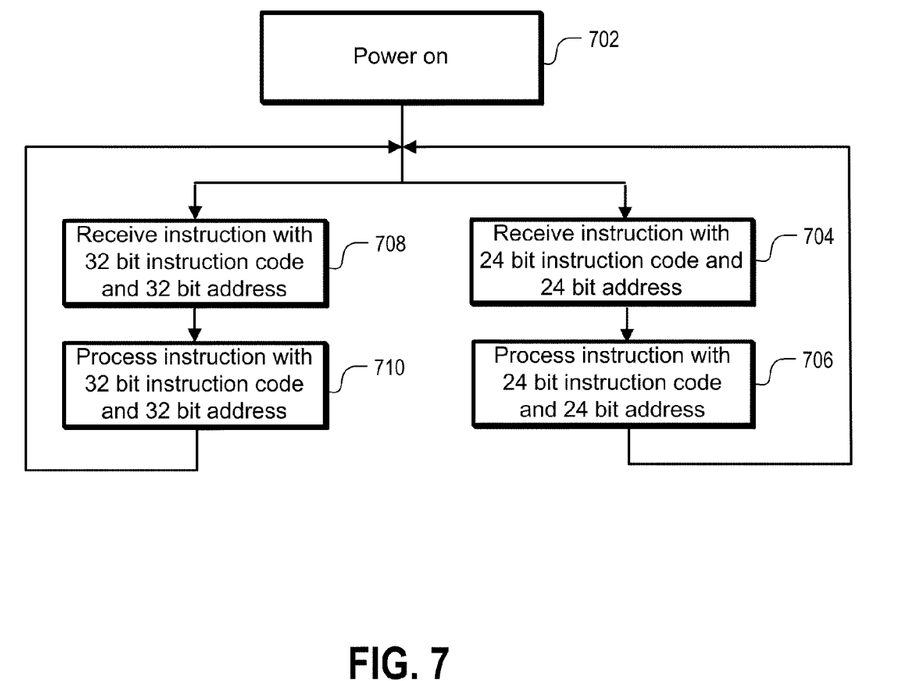
FIG. 7 is an example of a process flow of the memory integrated circuit which processes address mode instructions that indicate the present addressing mode (e.g., 24-bit addressing mode or 32-bit addressing mode) of the memory integrated circuit and accordingly processes memory instructions with (i) instruction codes that are distinct to the 24-bit addressing mode and the 32-bit addressing mode and (ii) 24-bit memory addresses or 32-bit memory addresses.

FIG. 7 is an example of a process flow of the memory integrated circuit which processes address mode instructions that indicate the present addressing mode (e.g., 24-bit addressing mode or 32-bit addressing mode) of the memory integrated circuit and accordingly processes memory instructions with (i) instruction codes that are distinct to the 24-bit addressing mode and the 32-bit addressing mode and (ii) 24-bit memory addresses or 32-bit memory addresses.

In 702, the integrated circuit power on. Then, subsequent operations depends on whether the instruction includes an instruction code in the 32 bit instruction code set or the 24 bit instruction code set. In 704, an instruction is received including an instruction code in the 24 bit instruction code set and a 24 bit address. In 706, the instruction is processed, which includes the instruction code in the 24 bit instruction code set and the 24 bit address. In 708, an instruction is received including an instruction code in the 32 bit instruction code set and a 32 bit address. In 710, the instruction is processed, which includes the instruction code in the 32 bit instruction code set and the 32 bit address.

Figure 8:
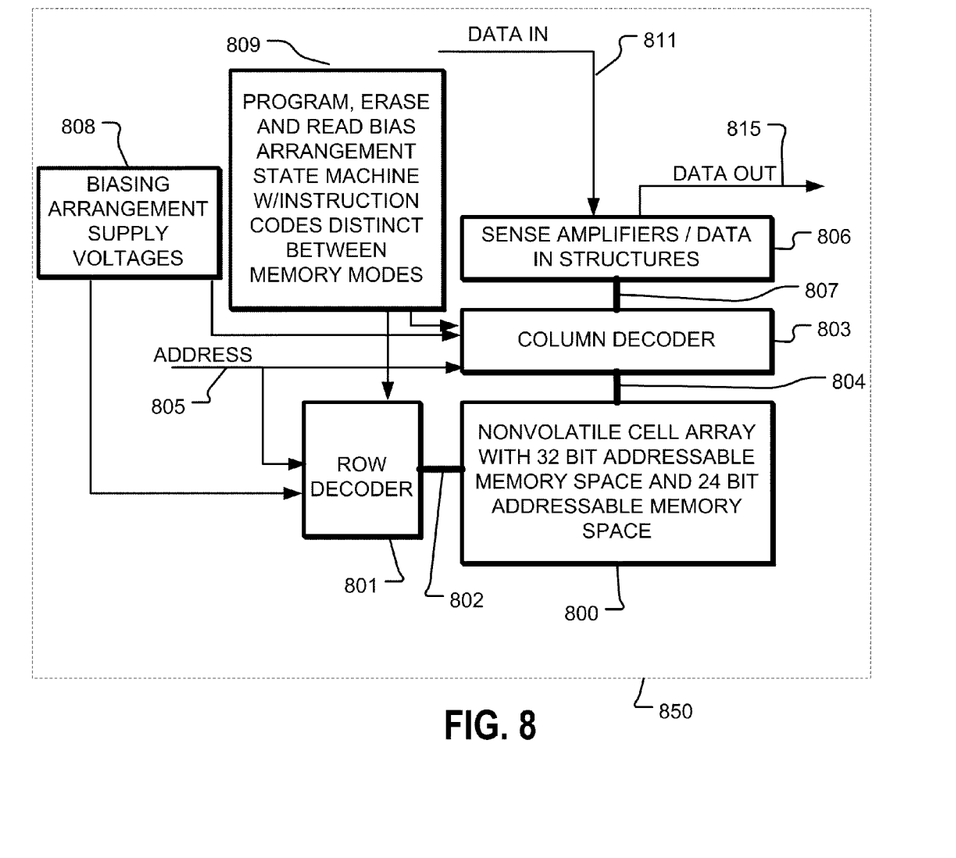
FIG. 8 is an example block diagram of the memory integrated circuit of FIG. 7 which processes address mode instructions that indicate the present addressing mode (e.g., 24-bit addressing mode or 32-bit addressing mode) of the memory integrated circuit and accordingly processes memory instructions with (i) instruction codes that are distinct to the 24-bit addressing mode and the 32-bit addressing mode and (ii) 24-bit memory addresses or 32-bit memory addresses.

FIG. 8 is an example block diagram of the memory integrated circuit of FIG. 7 which processes address mode instructions that indicate the present addressing mode (e.g., 24-bit addressing mode or 32-bit addressing mode) of the memory integrated circuit and accordingly processes memory instructions with (i) instruction codes that are distinct to the 24-bit addressing mode and the 32-bit addressing mode and (ii) 24-bit memory addresses or 32-bit memory addresses.

An integrated circuit 850 has a memory array 800 with a 32 bit addressable memory space and a 24 bit addressable memory space. A word line (or row) and block select decoder 801 is coupled to, and in electrical communication with, a plurality 802 of word lines, and arranged along rows in the memory array 800. A bit line (column) decoder and drivers 803 are coupled to and in electrical communication with a plurality of bit lines 804 arranged along columns in the memory array 800 for reading data from, and writing data to, the memory cells in the memory array 800. Addresses are supplied on bus 805 to the word line decoder and drivers 801 and to the bit line decoder 803. Sense amplifiers and data-in structures in block 806, including current sources for the read, program and erase modes, are coupled to the bit line decoder 803 via the bus 807. Biasing arrangement supply voltages 808 drive the row decoder 801 and word lines 802, and the column decoder 803 and the bit lines 804. A state machine 809 also drives the row decoder 801 and word lines 802, and the column decoder 803 and the bit lines 804. The state machine 809 is a program, erase and read bias arrangement state machine that processes instructions with instruction codes distinct between memory modes. Data is supplied via the data-in line 811 from input/output ports on the integrated circuit 850, to the data-in structures in block 806. Data is supplied via the data-out line 815 from the sense amplifiers in block 806 to input/output ports on the integrated circuit 850, or to other data destinations internal or external to the integrated circuit 850.

Additional Details

For a serial read command, the long address mode can operate in the first approach by starting a read at the specified starting long address in particular 128 Mb sector identified by the long address, and continue sequentially until the CS# bit is toggled, where the address wraps around in the sequential read within the particular 128 Mb sector identified by the long address in one alternative which provides 128 Mb automatic serial read, or wraps to the first, low address sector in another alternative which provides automatic serial read of the entire extended array.

For a serial read command, the long address mode can operate in the second approach by starting a read at the specified start address in the 128 Mb sector in the flag or register, and continue sequentially until the CS# bit is toggled, where the address wraps around within the identified 128 Mb sector in one alternative, or wraps to the first, low address sector in another alternative. For example, in a standard SPI flash, bit 2 of the security register can be used as the flag, and written as a register write command.

For a serial read command, the long address mode can operate in the third approach by starting a read at the specified start address in the 128 Mb sector identified by the extended command set, and continue sequentially until the CS# bit is toggled, where the address wraps around within the identified 128 Mb sector in one alternative, or wraps to the first, low address set or in another alternative.

The first, second and third approaches can be implemented by modifying an SPI flash memory of which a representative devices include the MX25L12805D and the MX25L12845E, the specifications of which are attached and incorporated herein. The approaches may be implemented in other devices and architectures.

The modifications for the 1st approach can include updating the firmware or command decode logic to recognize the extended command set, and adding a decoder for selected in the extended address space in response to decoding the commands.

The modifications for the 2nd approach can include adding a status register, or using reserved space in the specified status registers for the mode flag or register, and updating the firmware or command decode logic to recognize the extended command set, and adding a decoder for selected in the extended address space in response to decoding the extended commands and the mode flag or register.

The modifications for the 3rd approach can include updating the firmware or command decode logic to recognize the extended command set, and adding a decoder for selected in the extended address space in response to decoding the extended commands.

A system including a combination of a serial memory controller and a serial memory is also provided. The controller, such as an industry standard serial peripheral interface SPI bus master for a serial flash using an SPI serial interface, can be modified according to the first, second and third approaches by software and/or firmware updates only, and without changes in the physical serial interface.

Implementations can be backward compatible to original 24-bit address protocol on the beginning 128 Mb of a SPI serial flash device as described above. In the beginning 128 Mb, the data still can be read out by 24-bit address command as existing 128 Mb protocol. The sequential read can continue to read out all 256 Mb if no address change beyond the beginning 128 M. This enables the application driving the serial device to directly download whole code to DRAM or other working memory.

Figure 9:
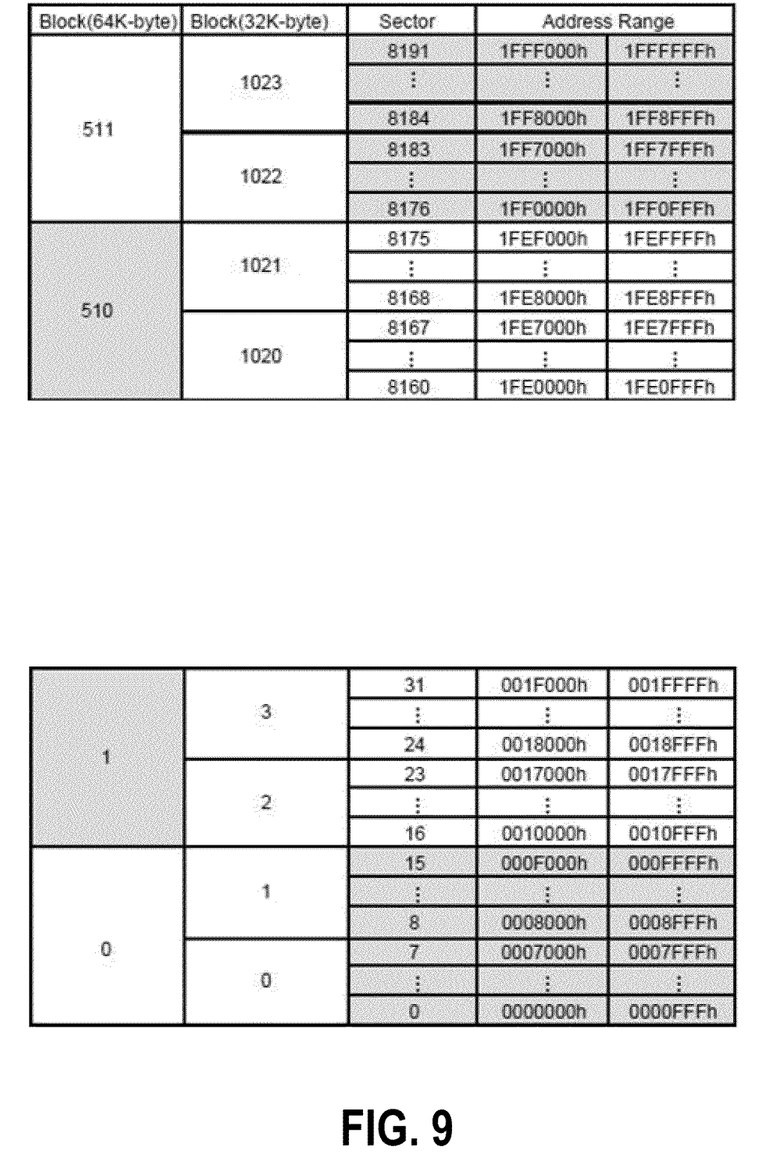
FIG. 9 is an example of a memory organization of the memory integrated circuit with multiple memory spaces addressed by memory addresses of different length (e.g., 24-bit memory addresses and 32-bit memory addresses).

FIG. 9 is an example of a memory organization of the memory integrated circuit with multiple memory spaces addressed by memory addresses of different length (e.g., 24-bit memory addresses and 32-bit memory addresses).

The example memory organization is for a 256 megabit memory. The 256 megabit memory is divided into 512 64 Kbyte blocks, or 1024 32 Kbyte blocks. Each 64 Kbyte block has 16 sectors. Each 32 Kbyte block has 8 sectors. Shown are the address ranges of the beginning and ending sectors of the 256 megabit memory.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An apparatus, comprising:
 a memory integrated circuit device, including:
  a memory array;
  an interface comprising an input pin receiving an instruction; and
  control logic having a selectable mode of a plurality of addressing modes processing the instruction, the plurality of addressing modes including:
   a first addressing mode in which the instruction includes a first instruction code and an address of a first length; and
   a second addressing mode in which the instruction includes the first instruction code and an address of a second length, wherein the first length of the address is different from the second length of the address, wherein:
    a first memory space of the memory array is addressable via the address of the first length, and
    a second memory space of the memory array is addressable via the address of the second length; and
   a column decoder and a row decoder, the column decoder and the row decoder accessing (i) all memory locations addressable via the address of the first length and (ii) all memory locations addressable via the address of the second length,
   wherein, a single copy of the address of the second length, which is received by the interface of the memory integrated circuit device, and which is received by the column decoder and the row decoder, is sufficient to access (i) any of the memory locations addressable by the address of the first length and (ii) any of the memory locations addressable by the address of the second length.

2. The apparatus of claim 1, wherein the first instruction code is one of a plurality of instruction codes compatible with the address of the first length and the address of the second length.

3. The apparatus of claim 1, wherein the control logic, by default, is in the first addressing mode processing the instruction including the first instruction code and the address of the first length.

4. The apparatus of claim 1, wherein responsive to processing by the control logic of the instruction including an address mode instruction code, the control logic is in the second addressing mode processing the instruction including the first instruction code and the address of the second length.

5. The apparatus of claim 1, wherein responsive to processing by the control logic of the instruction including a first address mode instruction code, the control logic is in the second addressing mode processing the instruction including the first instruction code and the address of the second length, and
 wherein responsive to processing by the control logic of the instruction including a second address mode instruction code different from the first address mode instruction code, the control logic is in the first addressing mode processing the instruction including the first instruction code and the address of the first length.

6. The apparatus of claim 1, wherein responsive to processing by the control logic of the instruction including a first address mode instruction code, the control logic is in the second addressing mode processing the instruction including the first instruction code and the address of the second length, and
 wherein responsive to processing by the control logic of the instruction including a second address mode instruction code different from the first address mode instruction code, the control logic exits the second addressing mode processing the instruction including the first instruction code and the address of the second length.

7. The apparatus of claim 1, wherein after powering and powering back on, the control logic is in first mode processing the instruction including the first instruction code and the address of the first length.

8. The apparatus of claim 1, further comprising:
 a memory space register different from the first memory space and the second memory space, the memory space register indicating whether to access the first memory space or the second memory space.

9. The apparatus of claim 1, wherein the first memory space is a part of the second memory space.

10. The apparatus of claim 1, wherein responsive to the control logic receiving the instruction including a read instruction code and the address of the first length while the control logic is in the first addressing mode, the control logic reads out (i) data from the first memory space beginning from the address of the first length and (ii) data from the second memory space inaccessible via the first length of address.

11. The apparatus of claim 1, wherein a plurality of memory spaces of the memory array include a default memory space, each memory space of the plurality of memory spaces addressable via a predetermined length of address, and the memory integrated circuit device further includes:
 a memory space register different from the plurality of memory spaces, the memory space register indicating whether to access the default memory space or another memory space of the plurality of memory spaces,
 wherein the control logic performs the instruction on the default memory space or another memory space of the plurality of memory spaces according to the memory space register.

12. The apparatus of claim 11, wherein the plurality of memory spaces includes at least the default memory space and a non-default memory space, and the predetermined length of address of the default memory space and the predetermined length of address of the non-default memory space have different address lengths.

13. The apparatus of claim 11, wherein responsive to processing by the control logic of the instruction including an address mode instruction code, the memory space register indicates access of said another memory space.

14. The apparatus of claim 11, wherein responsive to processing by the control logic of the instruction including a first address mode instruction code, the memory space register indicates access of said another memory space, and
 responsive to processing by the control logic of the instruction including a second address mode instruction code different from the first address mode instruction code, the memory space register indicates access of said default memory space.

15. The apparatus of claim 11, wherein after powering and powering back on, the memory space register indicates access of said default memory space.

16. The apparatus of claim 1, wherein the memory array has a first size addressable via the address of the first length, the memory array comprising a sub-array of a second size addressable via the address of the second length, the second length shorter than the first length,
 wherein the control logic performs the instruction with the address of the first length responsive to the instruction code being one of a first set of instruction codes, and the control logic performs the instruction with the address of the second length responsive to the instruction code being one of a second set of instruction codes.

* * * * *